United States Patent
Benito-Navazo

(10) Patent No.: US 6,335,485 B1
(45) Date of Patent: Jan. 1, 2002

(54) BOX FOR THE INSTALLATION OF ELECTRICAL APPARATUS IN A RACEWAY FOR ELECTRICAL CABLES

(75) Inventor: Juan Manuel Benito-Navazo, Sant Cugat Del Vallés (ES)

(73) Assignee: Aparellaje Electrico, S.A., Barcelona (ES)

(*) Notice: Subject to any disclaimer, the term of this patent is extended or adjusted under 35 U.S.C. 154(b) by 0 days.

(21) Appl. No.: 09/716,937

(22) Filed: Nov. 22, 2000

(30) Foreign Application Priority Data

Nov. 24, 1999 (ES) .................................................. 9902973

(51) Int. Cl.$^7$ .................................................. H02G 3/08
(52) U.S. Cl. .............................. 174/48; 174/50; 174/68.3; 220/3.2
(58) Field of Search .................. 174/48, 49, 50, 174/58, 60, 67, 68.3, 101; 220/32, 38, 33, 4.02, 4.01

(56) References Cited

U.S. PATENT DOCUMENTS

| | | | | |
|---|---|---|---|---|
| 3,927,698 A | * | 12/1975 | Johannsen | 174/101 |
| 4,017,137 A | * | 4/1977 | Parks | 174/48 |
| 4,710,853 A | * | 12/1987 | Reinhardt | 220/4.01 |
| 5,013,870 A | * | 5/1991 | Navazo | 174/50 |
| 5,086,194 A | * | 2/1992 | Bruinsma | 174/48 |
| 5,591,938 A | * | 1/1997 | Navazo | 174/50 |
| 6,005,187 A | * | 12/1999 | Navazo | 174/48 |
| 6,211,460 B1 | * | 4/2001 | Hull et al. | 174/48 |

FOREIGN PATENT DOCUMENTS

| | | |
|---|---|---|
| DE | 36 43 559 | 3/1988 |
| DE | 297 22 471 | 3/1998 |
| EP | 0 391 713 | 10/1990 |
| EP | 0 465 077 | 1/1992 |
| WO | PCT/SE90/00075 | 8/1990 |

* cited by examiner

Primary Examiner—Dean A. Reichard
Assistant Examiner—Angel R. Estrada
(74) Attorney, Agent, or Firm—Staas & Halsey, LL

(57) ABSTRACT

A box for installation of an electrical apparatus in a raceway for electrical cables. The box is fixed in the raceway which is formed by association of a base section and a cover section. The base section and the cover section are formed by the extrusion of a thermoplastic insulating material, wherein the base section is provided longitudinally on the inside of the edges of the walls thereof with shaped tubular beads, longitudinally forming an upper groove for the coupling of ribs of the cover section and a lower inverted spine opposite said groove. The box is formed by an upper portion and a lower portion, wherein the upper portion is attachable to the electrical apparatus and engageable in the groove of the shaped tubular beads. The lower portion is located with a slight clearance below the upper portion, and provided with a seating for the inverted spines of the shaped tubular beads. A mating member for mutually associating the upper portion and lower portion to determine the moving together of the upper portion and lower portion, and the clamping of the shaped tubular beads between the upper portion and lower portion.

8 Claims, 2 Drawing Sheets

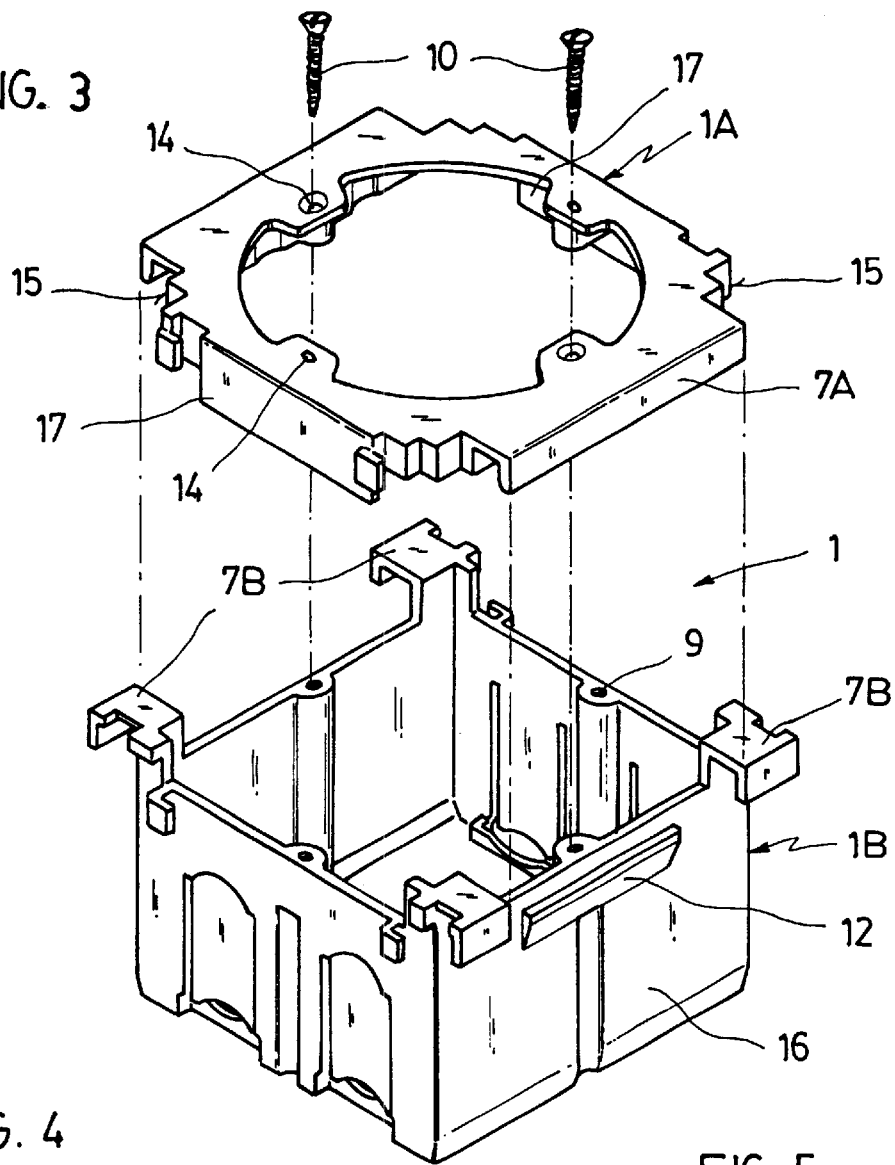
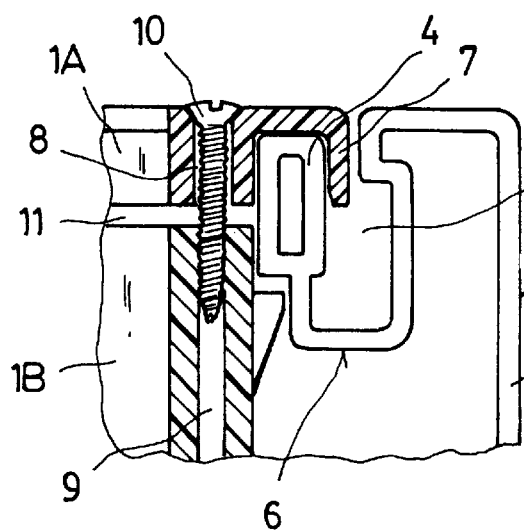
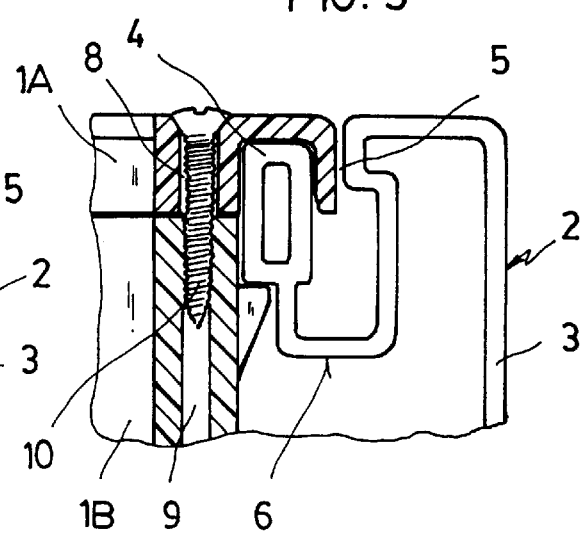

BOX FOR THE INSTALLATION OF ELECTRICAL APPARATUS IN A RACEWAY FOR ELECTRICAL CABLES

DESCRIPTION

1. Field of the Invention

This invention relates to a box for the installation of electrical apparatus in a raceway for electrical cables, which box is organized in such a way that, once it has been fitted in the raceway, the electrical apparatus has been mounted therein and has been electrically connected, it is provided with means allowing it to be locked in place in the raceway, making sliding thereof longitudinally along the raceway impossible.

In particular, this box includes means for fixation thereof in a raceway for electrical cables, especially a raceway of the type formed by the association of a base section and a cover section, formed by extrusion of a thermoplastic insulating material, in which the base section is provided longitudinally on the inside of the edges of the walls thereof with overhanging shaped tubular beads, each of which is formed with an upper longitudinal groove for engagement with ribs provided on the cover section, and a lower inverted spine opposite said groove.

2. Prior Art

With the purpose of holding the electrical apparatus assembly box immobile in the raceway and, particularly, in the longitudinal direction of the latter, solutions have been adopted based on screwing the box to the raceway, which required drilling operations on the raceway, in the arrangement of auxiliary abutment members, which makes the product and the assembly operation more expensive, and other fixing arrangements, none of which has been effective.

Under these circumstances, it would be desirable to have an electrical apparatus assembly box which, by way of a peculiar organization of the normal elements thereof, allowed it to be held immobile in the raceway in a simple, direct way.

SUMMARY OF THE INVENTION

In accordance with the foregoing ideas, the solution of providing the assembly box with means for fixation to the raceway, based on systems of pressing the box against the raceway, has been adopted.

According to the foregoing solution, the box for the installation of electrical apparatus in a raceway for electrical cables of the invention has been developed. The box is formed by an upper portion, which may be engaged in the grooves of the shaped tubular beads of the base section of the raceway and is provided with means for fixation of the electrical apparatus and of association with a lower portion which, located with a slight clearance below the said upper portion, is provided with means for seating on the inverted spines of the said shaped beads and with mating means of association with the upper portion which determine the moving together of both portions and the clamping of said shaped beads therebetween.

One preferred embodiment is constituted by a box which is formed by an upper portion which, in framelike fashion, comprises means for the seating and fixation of the apparatus and for the engagement of said portion in the grooves of the shaped beads of the base section of the raceway, in the same way as the cover section engages therein, and a lower portion which, suspended under said upper portion, forms the box proper for protecting the apparatus and is provided with means for engagement in said grooves, and of means for seating on the lower inverted spine of said overhanging shaped beads of the base section, both the upper and the lower portions having mating means for the firm mutual association thereof, determining the clamping of said shaped beads of the raceway therebetween.

One feature of the invention consists of the upper portion having the corners thereof cutaway for the passage of the engagement means provided on the lower portion for engagement thereof in the grooves of the shaped beads of the base section of the raceway.

A further feature of the invention resides in the fact that the means provided in the lower portion for the seating thereof on the inverted spines of the shaped beads of the base section of the raceway are formed by respective barb-like projections which are disposed on opposite surfaces of the lower portion which are parallel to the walls of said base section and have a surface parallel to the surface of the upper portion.

Yet a further feature of the invention resides in the fact that the means for the mutual association of the upper and lower portions which determine their mutual moving together and the clamping of the shaped beads therebetween are formed by self-tapping screws which pass through respective holes in the upper portion and penetrate firmly in blind holes provided in the walls of the lower portion, both in those which contain the barb-like projections and in the remaining ones disposed crosswise relative to the raceway.

The invention envisages that the upper portion has respective closure skirts on two opposite sides which overlap the outer surfaces of the walls of the box which are crosswise relative to the raceway.

BRIEF DESCRIPTION OF THE DRAWING

To facilitate the understanding of the foregoing ideas, there is described hereinafter the subject matter of the invention with reference to the accompanying drawings, in which:

FIG. 3 is an exploded perspective view of a preferred embodiment of the box for the assembly of electrical apparatus according to the invention;

FIG. 4 is a cross section view of a detail of the means for locking the box to the raceway in an inoperative position;

FIG. 5 is a view similar to the previous figure in which the means for locking the box to the raceway are in the operative position thereof.

DETAILED DESCRIPTION OF THE INVENTION

Figure 1A:
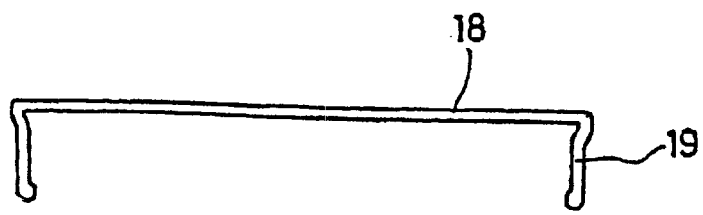
FIGS. 1A and 1B are front elevation views of a box for the assembly of electrical apparatus engaged in a raceway for electrical cables, in which the right-hand half of the box has been shown in cross section, and which may slide lengthwise of the raceway, since it is only suspended from the shaped tubular beads on the raceway.
Figure 1B:
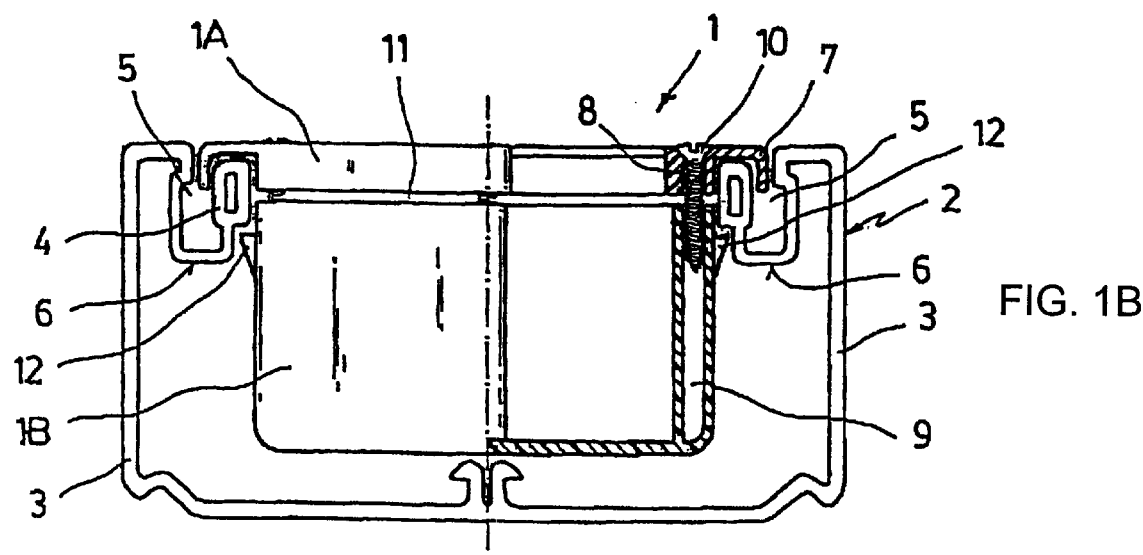
Figure 2:
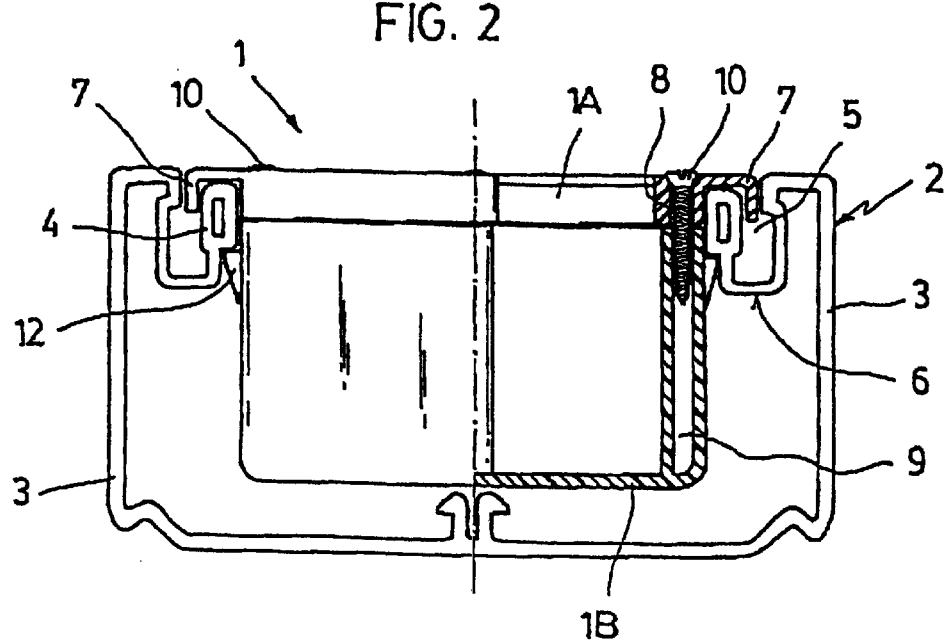
FIG. 2 shows the ensemble of the previous figure in which the box is locked in the raceway by clamping on the shaped tubular beads.

As may be seen in FIGS. 1 through 3, the object of the invention is a box 1 which is devised to be mounted in the base section 2 of a raceway having longitudinally on the inside of the edges of the walls 3 overhanging shaped tubular beads 4, each of which is formed with an upper longitudinal groove 5 in which there are engaged, ribs or wings 19 of corresponding cover section 18, and a lower inverted spine 6 opposite the groove 5.

The box 1, according to FIGS. 1B and 2, is constituted by an upper portion 1A, which may be fitted by means of elbowed tabs 7 in the grooves 5 of the shaped tubular beads 4 of the base section 2 of the raceway and which is provided with conventional means, to be described in detail hereinafter, for fixing the electrical apparatus and for association with a lower portion 1B, which are formed by through holes 8 in the upper portion 1A and blind holes 9 in the lower portion 1B associated together with self-tapping screws 10. The lower portion 1B, located below said upper portion 1A with a slight clearance 11 therebetween, is provided with seating means 12 engaging the lower inverted spines 6 of said shaped tubular beads 4.

As may be seen in FIG. 1B, the upper portion 1A and the lower portion 1B of the box 1 are connected together by self-tapping screws 10, while maintaining the clearance 11, whereby the box 1 may slide along the base section 2. However, as may be seen in FIG. 2, once the self-tapping screws 10 have been tightened, after mounting the electrical apparatus, not shown, the clearance 11 is reduced and the shaped tubular beads 4 are clamped between the elbowed tabs 7 and the seating means 12, whereby the box 1 is totally fixed in the base section 2 of the raceway.

FIG. 3 shows a preferred embodiment of the box 1, which is formed, in a like fashion to FIGS. 1B and 2, by an upper portion 1 A which, in frame-like fashion, comprises means 14 for attachment of the electrical apparatus and of elbowed tabs 7A for engagement in the grooves 5 of the shaped tubular beads 4, and a lower portion 1B which is suspended below the upper portion 1A and forms the box proper for the protection of the electrical apparatus and is provided with elbowed tabs 7B for engagement in the grooves 5, with seating means 12 and blind holes 9 for connection with the upper portion 1A and for fixing the electrical apparatus by way of the self-tapping screws 10.

The upper portion 1A in the embodiment of FIG. 3 has the corners 15 thereof cut away to allow for the passage of the elbowed tabs 7B of the lower portion 1B and also allow the engagement thereof in the base section 2 of the raceway.

On the other hand, the seating means 12 provided on the lower portion 1B are formed, in all cases, by respective barb-like projections which are disposed oppositely on the surfaces 16 which are parallel to the walls of the base section 2 and are provided with a surface parallel to the upper portion 1A.

It is envisaged that the upper portion 1A be provided on two opposite sides disposed crosswise relative to the base section 2 of the raceway with respective skirts 17 which overlap the surfaces 16 of the lower portion 1B.

FIGS. 4 and 5 show, on a larger scale, the means of the upper portion 1A and lower portion 1B which provide for the gripping of the ensemble on the shaped tubular beads 4 of the base section 2 of the raceway.

What I claim is:

1. A box for the installation of an electrical apparatus in a raceway for electrical cables, said box comprising:

means for fixation of said box in said raceway, said raceway being of the type formed by the association of a base section and a cover section, formed by extrusion of a thermoplastic insulating material, said base section having two lateral base walls, each base wall defining an edge with an inside, said base section being provided longitudinally on the insides of the edges of the walls thereof with overhanging shaped tubular beads, each of which is formed with an upper longitudinal groove for engagement with ribs provided on the cover section, and a lower inverted spine opposite said groove, said box being formed by an upper portion and a lower portion, said upper portion being provided with attachment means for attaching to the electrical apparatus, and with engagement means for engaging said upper portion in said grooves of said shaped tubular beads, said lower portion being located with a slight clearance below said upper portion, being provided with seating means for seating of said inverted spines of said shaped tubular beads, and being suspended under said upper portion to protect said apparatus, said upper portion and said lower portion having mating means for firm mutual association thereof, determining the moving together of said upper portion and said lower portion and the clamping of said shaped tubular beads of said raceway between said upper portion and said lower portion, and said upper portion having corners thereof cut away for passage of said engagement means provided on said lower portion for engagement in said grooves of said shaped tubular beads.

2. The box of claim 1, wherein said seating means are formed by two barb-like projections which are disposed on opposite surfaces of said lower portion which, being parallel to the base walls of said base section, have a surface parallel to the surface of said upper portion.

3. The box of claim 2, wherein said lower portion comprises walls which contain the two barb-like projections and which are disposed crosswise relative to said raceway, and said mating means are formed by self-tapping screws which pass through respective holes in the upper portion and penetrate firmly in blind holes provided in said walls of said lower portion.

4. The box of claim 2, wherein said lower portion comprises walls which contain the two barb-like projections and which are disposed crosswise relative to said raceway, wherein each of said walls defines an inner surface, said inner surfaces facing each other, and an outer surface opposed to the corresponding inner surface, said upper portion has two closure skirts on two opposite sides, each of which overlaps one of the outer surfaces of the walls of said box which are crosswise relative to the raceway.

5. A box for installation of an electrical apparatus in a raceway for electrical cables, said box comprising:

a fixing device fixing said box in said raceway;

a base section and a cover section forming said raceway and formed by extrusion of a thermoplastic insulating material, said base section having two lateral base walls, each base wall defining an edge with an inside, said base section provided longitudinally on the insides of the edges of the base walls with overhanging shaped tubular beads, each of said shaped tubular beads formed with an upper longitudinal groove for engagement with ribs provided on said cover section, and a lower inverted spine opposite said groove;

an upper portion and a lower portion forming said box;

an attaching device attaching said upper portion to the electrical apparatus;

an engaging device engaging said upper portion in said grooves of said shaped tubular beads;

a seating device, located on said lower portion, seating said inverted spines of said shaped tubular beads and engaging said beads in said grooves, said lower portion being located with a slight clearance below said upper portion and suspended under said upper portion to protect said electrical apparatus; and a mating device mutually associating said upper portion and lower portion, determining the moving together of said upper portion and lower portion, and clamping of said shaped tubular beads between said upper portion and lower portion, wherein said upper portion has corners that are cut away for passage of said engaging device provided on said lower portion for engagement in said grooves of said shaped tubular beads.

6. The box of claim 5, wherein said seating device is formed by two barb-like projections which are disposed on opposite surfaces of said lower portion which, being parallel to the base walls of said base section, have a surface parallel to the surface of said upper portion.

7. The box of claim 6, wherein said lower portion comprises walls which contain the two barb-like projections and which are disposed crosswise relative to said raceway, and said mating device is formed by self-tapping screws which pass through respective holes in the upper portion and penetrate firmly in blind holes provided in said walls of said lower portion.

8. The box of claim 6, wherein said lower portion comprises walls which contain the two barb-like projections and which are disposed crosswise relative to said raceway, wherein each of said walls defines an inner surface, said inner surfaces facing each other, and an outer surface opposed to the corresponding inner surface, and said upper portion having two closure skirts on two opposite sides, each of which overlaps one of the outer surfaces of the walls of said box which are crosswise relative to the raceway.

\* \* \* \* \*